United States Patent Office 3,457,167
Patented July 22, 1969

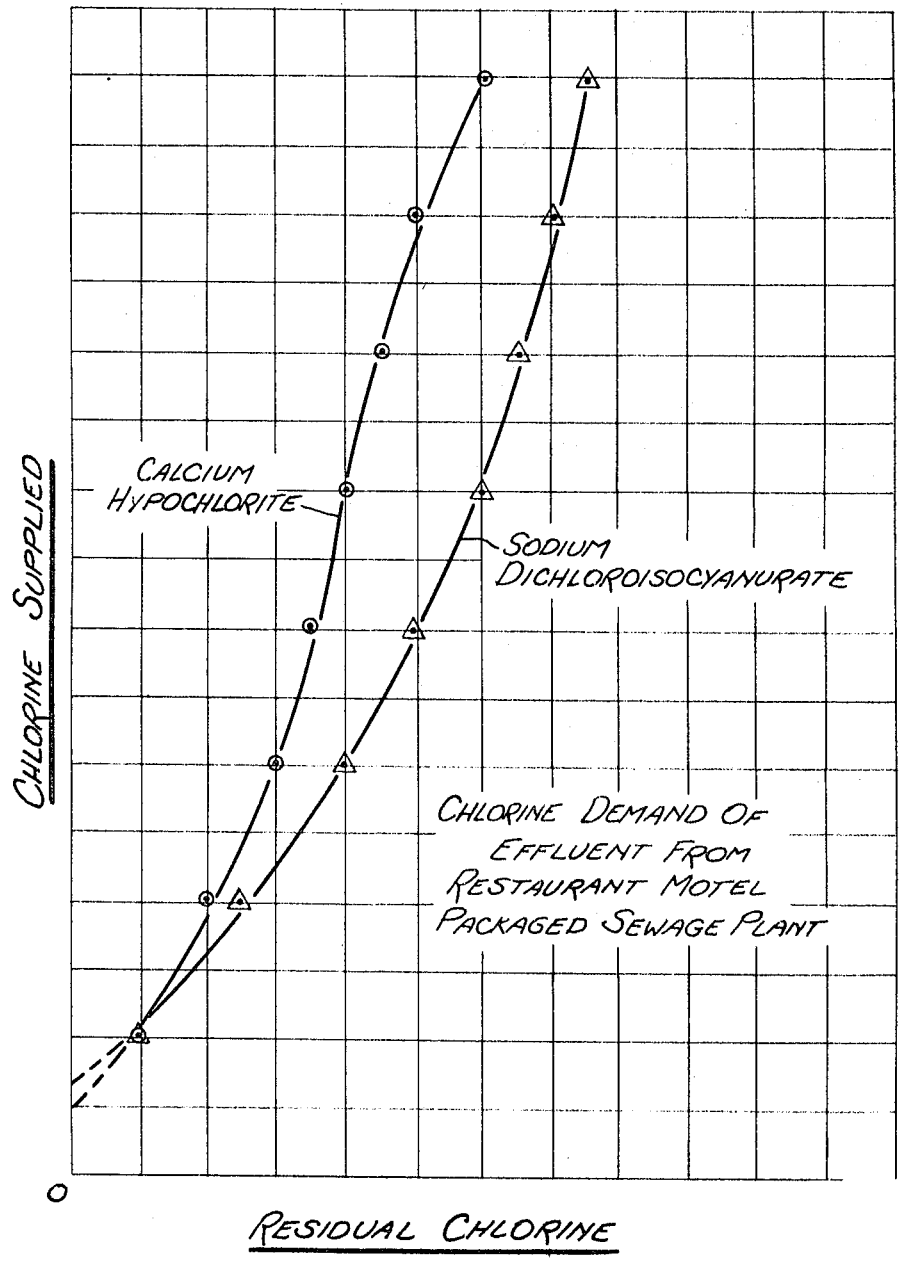

3,457,167
SEWAGE TREATMENT
Milton Spiegel, Los Angeles, Calif., and John A. Shepherd, Princeton, N.J., assignors to FMC Corporation, New York, N.Y., a corporation of Delaware
Filed Sept. 5, 1967, Ser. No. 665,375
Int. Cl. C02c 5/04, 1/02
U.S. Cl. 210—3  3 Claims

ABSTRACT OF THE DISCLOSURE

Process for treatment of effluent of activated sludge packaged sewage plant by means of sodium dichloroisocyanurate, potassium dichloroisocyanurate or the complexes of trichloroisocyanuric acid therewith, trichloroisocyanuric acid, or dichloroisocyanuric acid.

---

This invention relates to sewage treatment, and more particularly to an improvement in the operation of the well-known packaged sewage treatment plants. These are prefabricated plants usually having a capacity of up to about 150,000 gallons of sewage per day, in which the sewage is brought into contact with activated sludge under aerobic conditions and the liquid of the resulting mixture is separated from the sludge. The effluent often has a high bacterial content (e.g. an aerobic organism content in the range of about $1 \times 10^7$ to $5 \times 10^7$ per ml.) and an observable discoloration.

A typical plant of this type is described in Bulletin 6231, of 1966, of Chicago Pump, FMC Corporation. Other reports describing such plants are found in the paper entitled "Package Aeration Plants" by Ralph H. Baker Jr. presented at the annual meeting of the American Water Works Association (and Water Pollution Control Federation) at Charlotte, N. C., Nov. 12, 1963 (and reprinted by the Florida State Board of Health, Bureau of Sanitary Engineering, Division of Waste Water, in a bulletin entitled "Florida's Experiences With Small Activated Sludge Plants"), and in the bulletin dated September 1966 of the National Sanitation Foundation, Ann Arbor, Mich., entitled "Package Plant Criteria Development Part I; Extended Aeration."

Prior to discharging the effluent into a stream or other body of water it is conventionally chlorinated by adding a solution of a hypochlorite such as sodium hypochlorite or calcium hypochlorite in amount sufficient to produce a chlorinated effluent containing at least about 1 p.p.m. of chlorine residual (as measured by the known "five minute analysis" using the orthotolidine colorimetric method).

In accordance with one aspect of this invention the chlorination of the effluent is effected by the addition of one or more of the following chloroisocyanurate materials: sodium dichloroisocyanurate; potassium dichloroisocyanurate; a complex of potassium dichloroisocyanurate and trichloroisocyanuric acid such as the compounds known as [(mono-trichloro,) tetra- (monopotassium dichloro,)] penta-isocyanurate, and (trichloro,) (monopotassium dichloro,) di-isocyanurate or mixtures of these complexes; trichloroisocyanuric acid; or dichloroisocyanuric acid. It is found, surprisingly, that the amount of the chloroisocyanurate material required to attain the target percentage of residual chlorine in the effluent is substantially less, in terms of the amount of chlorine in the additive, than when the conventional chlorinating agents are used. Despite the smaller amount of chlorine required the use of the process of this invention gives a high bactericidal effect (e.g. in terms of bacterial count and time-kill tests). In addition, when this invention is employed little, if any, maintenance of the chlorinating equipment is required; for example, when the chloroisocyanurate material is added as an aqueous solution, there is no tendency for the solution to form a sludge which can collect in, and interfere with, the operations of the proportioning pumps used for feeding the chlorinating solution into admixture with the liquid effluent, or the mixing tanks or associated equipment, and the chlorinating solution exhibits good stability.

The reasons for the improved effectiveness of the chloroisocyanurate material is not understood. In an effort to determine whether the lower chlorine demand is a result of the failure of this material to react with substances with which hypochlorite did react, in the effluent, the following comparative tests were carried out. After the attainment of a given residual chlorine value, on samples of the same effluent, by treatments with (a) sodium dichloroisocyanurate and (b) calcium hypochlorite, equal amounts of the hypochlorite were added to both samples. The effects, in terms of final residual chlorine content, were identical indicating that the lower chlorine demand with the sodium dichloroisocyanurate is not a result of a less effective oxidation of oxidizable material by this substance.

The chloroisocyanurate material may be conveniently added as a solution having a concentration of, for example, about 0.1–10%, preferably at least about 1% and most preferably about 2–5%. The chloroisocyanurate materials are readily soluble in water at these concentrations (except for the free acids, whose solubility is lower than 2%) and the solutions have good stability; thus a quantity of solution may be made up once and used for days without requiring attention. The chloroisocyanurate material may also be conveniently added in solid (e.g. powder) form; it is found to dissolve readily in the unchlorinated effluent without sludge formation.

The chloroisocyanurate material will generally be metered into the unchlorinated effluent at a rate such as to provide about 1–6 p.p.m. of residual chlorine (measured by the five minute method). Usually the effluent to be chlorinated will be at a temperature in the range of about 5 to 50° C.

The drawing is a graph showing the relationship between chlorine added and residual chlorine of the effluent of a packaged sewage plant of a restaurant and motel and compares the effects of using one of the chloroisocyanurate materials, specifically sodium dichloroisocyanurate, and calcium hypochlorite to supply the chlorine.

The following examples are given to illustrate this invention further. In the examples (as well as in the rest of the application) all parts are by weight unless otherwise specified. The examples are all carried out at room temperature (20–25° C.) unless otherwise indicated.

Example 1

This example relates to the treatment of the effluent of a packaged sewage treatment plant which receives untreated sewage from an industrial research laboratory at the rate of 7000 gallons per day. The sewage (after passing successively through a grit-removal chamber, a comminutor and a preliminary settling tank) enters an aeration tank. Aerated digested material (formed, during the process, from previously treated sewage) also flows into the same aeration tank from an aerobic digester. Air is bubbled through the contents of both the aeration tank and the aerobic digester. The material flows from the aeration tank to a final settling tank where the sludge settles out for return in part to the digester and in part to the aeration tank. The supernatant liquid ("unchlorinated effluent") flows from the final settling tank to a chlorine contact tank where it is mixed with a metered stream of an aqueous solution containing 1% available chlorine prior to discharge. The time of contact between chlorine-yielding solution and effluent in the chlorine contact tank is at least 15 minutes, preferably longer (e.g. 30 minutes, or as much as several hours, depending on the capacity of the equipment relative to the load).

For comparative purposes the unchlorinated effluent is mixed separately with (a) an aqueous solution of sodium dichloroisocyanurate containing 1% of available chlorine and (b) an aqueous solution of calcium hypochlorite, also containing 1% of available chlorine (made by dissolving in water the commonly used granular calcium hypochlorite having 70% available chlorine), and the amount of each solution necessary to yield the target value of residual chlorine in the resulting chlorinated effluents (2 p.p.m., by the "five minute analysis," corresponding to about 0.8 p.p.m. by the "instant analysis") is determined. These comparative determinations are carried out on a series of unchlorinated effluent samples taken at hourly intervals from the sewage plant. In each case the amount of chlorine from the sodium dichloroisocyanurate required to attain the target of residual chlorine is appreciably less (e.g. about 20% less) than the amount of chlorine from calcium hypochlorite required for the same purpose.

The method used in this example for analysis of residual chlorine content is the same as that described in "Standard Methods-Water and Waste Water, APHA, AWWA, WPCF, American Public Health Ass'n., Inc." 1960, pp. 103–105 in which the residual chlorine is determined by a conventional orthotolidine (OTA) colorimetric method, with a new colorimetric value being read every fifteen minutes until there is no change in three readings. In carrying out the analyses the color may be read immediately after the addition of the color producing reagent (the so-called "instant analysis") or five minutes after the addition of the color producing reagent (the "five minute analysis").

Example 2

Example 1 is repeated for another packaged sewage plant of the same type serving a motel-restaurant complex and receiving raw sewage at the rate of about 35,000 gallons per day. Results similar to those described in Example 1 are obtained. In each case the ratio of the average amounts of the sodium dichloroisocyanurate and calcium hypochlorite solutions required to give 0.8 p.p.m. residual chlorine is the same; that is, on the average 26 p.p.m. of initial available chlorine supplied by the dichloroisocyanurate solution attains the same result as 32 p.p.m. of initial available chlorine supplied by the hypochlorite solution. The same results (i.e. the lower chlorine demand when the dichloroisocyanurate is used) are obtained even after pH adjustment to increase the pH of the mixture treated with the dichloroisocyanurate to make it the same as that of the mixture treated with the hypochlorite.

In both Examples 1 and 2, the chlorination is effective in each case to kill most of the bacteria in the effluent within 10 minutes but not to increase the chemical oxygen demand (as measured by A.S.T.M. method D1252–60) appreciably. The treatment with the sodium dichloroisocyanurate has an excellent bleaching effect on the effluent.

It is to be understood that the foregoing detailed description is merely given by way of illustration and that many variations may be made therein without departing from the spirit of my invention. The "Abstract" given above is merely for the convenience of searchers and is not to be given any weight in defining the scope of the invention.

We claim:

1. In the process for sewage treatment in which sewage is brought into contact with activated sludge under aerobic conditions, the liquid of the resulting mixture is separated from the sludge, the effluent is mixed with an aqueous chlorinating material, and a chlorinated effluent containing about 1 to 6 p.p.m. of residual chlorine (determined by the o-tolidine five minutes colorimetric method) is discharged, the improvement which comprises employing, as said chlorinating material, a material selected from the group consisting of sodium dichloroisocyanurate, potassium dichloroisocyanurate, complexes of potassium dichloroisocyanurate and trichloroisocyanuric acid, trichloroisocyanuric acid, and dichloroisocyanuric acid, said material being supplied in amount sufficient to produce a chlorinated effluent containing about 1 to 6 p.p.m. of residual chlorine.

2. Process as in claim 1, in which process the liquid sewage flows to an aeration zone together with aerated digested material supplied from an aerobic sludge digestion zone and flows from the aeration zone to a settling zone from which a supernatant liquid effluent having an aerobic organism content in the range of about $1 \times 10^7$ to $5 \times 10^7$ per ml. is withdrawn and passed to a chlorination zone, at a temperature in the range of about 5 to 50° C., together with said amount of said chlorinating material.

3. Process as in claim 2 in which said chlorinating material supplied to said chlorination zone is an aqueous solution of sodium dichloroisocyanurate of about 1 to 5% concentration and in which said settling zone yields said supernatant liquid and a sludge, which sludge is passed in part to said digestion zone and in part to said aeration zone.

References Cited

UNITED STATES PATENTS

| 2,901,114 | 8/1959 | Smith et al. | 210—7 X |
| 3,047,492 | 7/1962 | Gambrel | 210—7 |
| 3,147,219 | 9/1964 | Paterson | 210—62 |
| 3,205,229 | 9/1965 | Matzner | 260—242 |
| 3,347,784 | 10/1967 | Kappe | 210—7 X |

MICHAEL E. ROGERS, Primary Examiner

U.S. Cl. X.R.

210—62; 424—249